United States Patent Office

2,823,132
Patented Feb. 11, 1958

2,823,132

STABLE PICKLE LIQUORS FOR CURING MEAT

Louis Sair, Evergreen Park, Ill., assignor to The Griffith Laboratories, Inc., Chicago, Ill., a corporation of Illinois No Drawing. Application April 26, 1954
Serial No. 425,724

12 Claims. (Cl. 99—222)

The present invention relates to brine compositions for curing meat products and in particular to such liquids containing nitrite salt and a form of an ascorbic acid. It also relates to dry solid compositions useful for making such stable pickles.

Because meat pickling brines are allowed to stand over periods of days after formation and before complete consumption, it is essential that they be compounded for stability in certain important ingredients which are the nitrite content and the ascorbic content.

It is known that l-ascorbic acid and its optical isomer d-ascorbic acid function advantageously in the curing of meat in the presence of nitric oxide. It is a curing catalyst and a color stabilizer. The nitric oxide derives from nitrous acid which is released from a nitrite salt present during the curing. The nitrite salt is commonly an ingredient of the composition initially provided. However, when the nitrogen curing salt is provided only as the nitrate, it is reduced in the first stages of the cure to nitrite or nitrous acid. Curing compositions in common use include both nitrite and nitrate salts, the former to act initially and the latter to be reduced for continuing the function of nitric oxide.

The nitric oxide forms nitroso compounds with protein pigments of the blood and the lean of the meat. Reduction is normal by reason of natural enzymes in the meat, and it may be accelerated and enhanced by the presence of an ascorbic acid. The red color is enhanced by heat which converts the pigment to nitrosohemochromogen and nitrosomyochromogen.

The general reactions are known but the precise mechanisms are obscure. At first, the pigments turn gray on reaction with nitrous acid and this is an oxidation giving a ferri-compound described as methemoglobin. Then reduction and red-coloration occur producing a ferro-nitroso-pigment. The presence of an ascorbic acid in the cured product presenting the desirable color of the nitrosohemochromogen and nitrosomyochromogen functions to retard oxidation at the surface exposed to the atmosphere, as when displayed for the purpose of sale. Such oxidation tends to produce green-gray-brown discoloration.

The meat packing industry is accustomed to purchasing its curing salt compositions in dry salt form. When these compositions are used for forming pickle liquors they are frequently limited in composition to only a portion of the solid content of the brine to be formed. Some solid compositions are constituted so that on addition to water a complete pickle is formed. Other compositions are compounded for use with water, sodium chloride, sometimes sugar and sometimes other flavoring ingredients.

Nitrite values and ascorbic values are unstable because of interaction. For example, nitrite salt in a solid salt composition containing a free ascorbic acid is wholly unstable in both nitrite and ascorbic values. When the ascorbic values are present as alkali metal salt and the composition has acquired moisture, the nitrite value is unstable when the pH value is below 7.6. However, in pickle liquor compositions, the safe pH range for stability of the liquor with respect to both nitrite and ascorbic values is shifted downwardly in the pH scale as explained hereinafter. As a result, any long-standing stable solid curing salt composition containing nitrite and ascorbic values is suitable for dissolution to provide pickle liquor having keeping qualities for commercial needs.

It is the general object of the present invention to provide ascorbic-nitrite meat-curing pickles which are suitably stable under the commercial conditions of use, which contemplates storage at about 40° F. or lower.

In making pickle liquor of the present invention, the ascorbic values may be provided as a water-soluble salt of an ascorbic acid, or as a free ascorbic acid along with a suitable alkaline agent to effect the stabilizing pH. When a solid salt composition containing nitrite and ascorbic values is employed, an ascorbate salt is used, preferably with sufficient alkaline material to stabilize it for storage. However, where such a solid composition is not held in storage after compounding, the alkaline agent may be reduced in quantity from a stabilizing amount, or even omitted entirely.

A water-soluble salt of the selected ascorbic acid is used, preferably alkali metal salt. The sodium salts of d-ascorbic acid and of l-ascorbic acid are interchangeable in the present invention. Accordingly, where the present description refers to ascorbic acid, or to an ascorbic acid, or to sodium ascorbate, it is to be understood that it exemplifies any one or both of the two isomers and the alkali metal salts thereof. The l-isomer is vitamin C. The d-isomer is about one-twentieth as potent as a vitamin, and hence is preferred to avoid "medication."

Ascorbic acid in solution has a pH of 2.5. Sodium ascorbate in solution has a variable pH. According to the Merck Index, 6th edition, 1952, the pH of sodium ascorbate solution varies from 5.5 to 5.9, while the U. S. P. specification for pH is from 5.6 to 7.0. These variations are explained by the hydrolysis of sodium ascorbate so that the pH may be varied by slight changes in the ratio between the sodium ion and the ascorbate radical.

Sodium ascorbate may be made in numerous ways, one being described in Holland U. S. No. 2,442,005. The present disclosure relates to a sodium ascorbate which when dissolved in water as a 5% solution has a pH of 6.8 to 6.9, meeting the U. S. P. specification just short of neutral pH of 7. It is employed herein as a dry solid salt.

The present application is a continuation-in-part of my copending Serial No. 269,939, now abandoned. In said co-filed application, stable solid salt compositions containing nitrite and ascorbic values are disclosed and claimed in terms of pH values upwardly from 7.6, and in terms of an alkaline material as a pH-controlling agent. The present application teaches that stable pickle liquors may be made by use of the ingredients separately or freshly compounded so long as the resulting liquor is maintained at or below about 40° F. and has a pH upwardly from 6.4. For stable ascorbic-nitrite pickle liquors, the safe pH may be below the said limit of 7.6 for stable ascorbic-nitrite solid salt compositions, because the high water content holds released nitrous acid.

In making pickle liquors of the present invention, the ascorbic values may be supplied by using free l-ascorbic acid, free d-isoascorbic acid, or their alkali metal salts. When using the free acid, an alkali or alkaline salt must be used to control the pH. When using the alkali metal salt, an alkaline salt may or may not be required depending in part upon the pH of the alkali metal ascorbate employed and in part on the pH to be achieved.

Pickle liquor A has been made in proportions as follows:

Water (200 gallons) _____ pounds__ 1670
Sodium chloride _____ do____ 285
Curing salt crystals _____ do____ 55
    Sodium chloride _____ percent__ 90
    Sodium nitrite _____ do____ 6
    Sodium nitrate _____ do____ 4
    Adjusted to pH of 8 with about 0.02% of sodium tripolyphosphate.

To several 50-gallon batches of pickle liquor A (containing .825 lb. of sodium nitrite) there have been added several alkaline agents in varying quantities, set forth in Table I. The pH value thereby effected is given under the heading "Before B." Then to each batch is added:

Composition B:                                Pounds
    Cane sugar _____ 15.0
    Ascorbic acid _____ 1.5

The changed pH is recorded in Table I under the heading "After B," along with the nitrite content on aging, as analyzed. The stable liquors are identified as examples.

of 10% with such curing liquor. Table II shows the changing nitrite content and the initial pH value for pickle liquor C for various pH regulators X.

*Table II*

| Composition or Example | pH Regulator in Pickle Liquor C | X | pH | Sodium Nitrite Content in Percent on aging— | | | |
|---|---|---|---|---|---|---|---|
| | | | | 1 hr. | 5 hrs. | 20 hrs. | 4 days |
| C | Control [1] | | 7.9 | 0.17 | | | 0.17 |
| D | None | | 5.3 | 0.15 | 0.14 | 0.13 | 0.11 |
| E | Sodium hexametaphosphate | 13.75 | 4.8 | 0.05 | | | |
| Ex. 4 | Sodium tripolyphosphate | 6.87 | 6.5 | 0.17 | | 0.16 | 0.17 |
| Ex. 5 | ___do___ | 13.75 | 7.5 | 0.17 | 0.18 | 0.17 | 0.17 |
| Ex. 6 | Sodium carbonate | 5.0 | 9.5 | 0.17 | 0.17 | | 0.17 |
| Ex. 7 | ___do___ | 6.87 | 9.6 | 0.17 | 0.17 | | 0.17 |
| Ex. 8 | ___do___ | 1.72 | 8.6 | 0.17 | | | 0.17 |
| Ex. 9 | ___do___ | 1.29 | 8.25 | 0.17 | | | 0.17 |
| Ex. 10 | ___do___ | 0.86 | 6.55 | 0.17 | | | 0.17 |

[1] No ascorbic acid and no pH regulator.

In Table II all the liquors having pH from 6.5 upwardly are suitably stable.

*Example 11.*—This is made by adding to 50 gallons of pickle liquor A the following:

Composition F:                                Pounds
    Cane sugar _____ 15.0
    Sodium ascorbate (pH 6.8 to 6.9) _____ 1.5

The resulting pH is 7.7 and the pickle remained stable in nitrite value for as long as 17 days.

*Example 12.*—A dry mixture is first made as Composition G.

Ounces
Sodium chloride _____ 39.0
Sodium nitrite (commercial) [1] _____ 1.92
Sodium nitrate (commercial) _____ 1.28
Sodium ascorbate (pH=6.8 to 6.9) _____ 0.5
    Total _____ 42.70

*Commercial sodium nitrite is 99.5% pure, containing a small amount of stabilizing alkali of little effect in the compositions of the present invention.

Pickle liquors 12a, 12b and 12c were made promptly

*Table I*

| Composition or Example | Agent Added to A | | pH | | Sodium Nitrite Content in Percent | | |
|---|---|---|---|---|---|---|---|
| | Kind | Lbs. | Before B | After B | Theory | After 3 Days | After 18 Days |
| AB | None | | 8 | | | | |
| AB-1 | Na₂HPO₄.2H₂O | 4.5 | 7.80 | 6.1 | 0.157 | 0.093 | 0.025 |
| AB-2 | Na₂HPO₄.2H₂O | 9.0 | 7.75 | 6.3 | 0.157 | 0.092 | 0.064 |
| Ex. 1 | Na₂HPO₄.2H₂O | 18.0 | 7.60 | 6.4 | 0.157 | 0.161 | 0.152 |
| Ex. 2 | Na₂CO₃ | 1.5 | 9.70 | 8.7 | 0.157 | 0.160 | 0.163 |
| Ex. 3 | Na₃PO₄.1H₂O | 3.0 | 10.60 | 9.6 | 0.157 | 0.165 | 0.159 |
| AB-3 | Na₅P₃O₁₀ | 4.5 | 7.30 | 5.6 | 0.157 | 0.087 | 0.021 |

The free ascorbic acid tends to lower the pH of pickle liquor A containing the added alkaline salt, which latter tends to raise the pH. When the resulting pH is under 6.4 and as shown at 6.3, the nitrite loss is appreciable. At and above pH of 6.4 the nitrite content is suitably stable.

Pickle liquor C (described in Serial No. 269,939) has been made as follows:

Pounds
Water _____ 394.00
Sodium chloride _____ 67.50
Cane sugar _____ 15.00
Curing salt crystals (as in Liquor A) _____ 13.75
D-isoascorbic acid _____ 1.72
pH regulator _____ X
    Total _____ 492+X Such a pickle liquor is useful for arterial pumping into hams to increase the weight by an amount on the order by addition of 3 pounds of Composition G to 10 gallons of 65° salometer brine (7 lbs. 5 oz. sodium chloride in 10 gallons of water) with varying amounts x of sodium carbonate. Table III gives the said amounts x, the initial pH of the pickle liquors, each of which remained stable in nitrite value for 3 days at 40° F.

*Table III*

| Example | x Ounces | pH |
|---|---|---|
| 12a | 1 | 8.9 |
| 12b | 2 | 9.5 |
| 12c | 3 | 9.6 |

As set forth in my co-filed application, solid curing salt compositions containing both nitrite and ascorbic values are stable as to both values when the pH is upwardly from 7.6. These compositions may contain all or less than all of the ingredients for a meat-curing salt, some of the ultimate sodium chloride and other pH-inert ingredients being permissibly and commonly absent. When such a solid salt composition containing both nitrite and ascorbic values is to be used for forming pickle, by adding it to water, or to water containing pH-inert substance such as sodium chloride, cane sugar, dextrose, and seasonings, the desired stability of the pickle liquor is assured. However, stability may be achieved by using promptly compositions which become unstable if stored.

For making pickle the pH of the ascorbate salt is important. As described above, it may vary in pH so that some forms in the lower range of pH require additional alkaline material to raise the pH of the pickle to the pH values required for stability. The sodium ascorbate prepared for use in the present invention, as described above, is of itself sufficient in its pH to avoid the use of added alkali.

*Example 13.*—A pickle liquor D is made as follows:

Water _____gallons__ 50
Curing salt crystals (as in pickle liquor A)
    pounds__ 13.75
Sodium chloride (pH=8.1) _____do____ 71.25

To the above is added:

Seasoning composition on sugar base_____pounds__ 7
Cane sugar_____do____ 8
Sodium ascorbate (pH=7.7) _____do____ 1.5

The stability in nitrite is as follows:

|  | Percent nitrite |
|---|---|
| Original | 0.170 |
| After 5 days | 0.160 |
| After 16 days | 0.158 |

*Example 14.*—A pickle liquor E is made as follows:

Water _____gallons__ 50.00
Sodium nitrite (C. P.) _____pounds__ .83
Sodium nitrate (C. P.) _____do____ .55
Sodium chloride (pH=7.0) _____do____ 83.6

To the above was added:

Cane sugar_____pounds__ 6.95
Sodium ascorbate (pH=6.9)_____do____ .5

The resulting pH was 6.9. Then a second half-pound of the same sodium ascorbate was added, with no change of pH. Again a half-pound of the same sodium ascorbate was added, with no change in pH. Because the particular sodium ascorbate used has a pH above the lower pH limit for stability of the nitrite, the pH regulator is the alkaline agent associated with the ascorbate radical in the sodium ascorbate.

Although the preferred salts for all of the minor components, especially the nitrite, nitrate, ascorbate and alkaline agent, are disclosed as sodium salts, it is to be understood that this is only the preferred alkali metal. Potassium nitrite and nitrate are well known as ingredients of meat-curing compositions. The potassium may as well be provided as the ascorbate salt or as the alkaline agent, or both, without departing from the spirit and scope of the invention.

In the meat-curing trade, a wide variety of formulations are employed, some within federal regulations and some outside thereof. For example, for the dry-salt cure of bacon, the U. S. regulations impose maximum limits per 100 lbs. of bellies of one ounce of sodium nitrite and of ¾ ounce of ascorbic acid, and in cornbeef pumping pickle maximum limits per 100 gallons of pickle of two pounds of sodium nitrite and of 2¼ pounds of ascorbic acid. However, in many instances, less nitrite is used, commonly in the case of bacon, 70% of said limit, and frequently as little as .5 ounce per 100 lbs. of bellies. In the curing of meat, the ascorbic acid functions not only with respect to the nitrite of the original composition, but also with respect to the subsequently reduced nitrate of the original composition. In the present invention, which concerns the stability of the initial compositions prior to application to meat, or prior to modification for such use, the ascorbic compound is functionally related only to the original nitrite content. Because ascorbic content is beneficial, rather than necessary, its content may vary upwardly from zero. When any amount, however small, is present, it necessitates control of the pH. The amount of ascorbic content is predetermined by the particular cure at hand involving nitrogen-containing curing salt selected from the group consisting of alkali-metal nitrite and nitrate including essentially the nitrite salt.

The foregoing circumstances establish that the present invention is not limited to or by any particular ratio between nitrite and ascorbic values, but concerns compositions as described containing both nitrite and ascorbic values, in ratio predetermined by other factors.

Accordingly, the present invention contemplates a suitably stable sodium chloride meat-curing brine containing nitrite values and ascorbic values, with a pH upwardly from 6.4.

Numerous changes and modifications are contemplated as falling within the scope of the appended claims.

I claim:

1. An aqueous pickle liquor for use in curing meats containing essentially (1) sodium chloride, (2) alkali metal nitrite, (3) material providing an ascorbate radical, and (4) pH regulating material providing alkali metal ions in part at least forming alkali-metal ascorbate and present in kind and quantity to impart to the liquor a pH of at least 6.4, whereby said liquor remains substantially stable in nitrite value for a period up to eighteen days under conditions of storage at about 40° F.

2. An aqueous pickle liquor for use in curing meats containing essentially (1) sodium chloride, (2) alkali metal nitrite, and (3) alkali metal ascorbate as the reaction product of an isomer of ascorbic acid and a carbonate of alkali metal in kind and quantity to impart to the liquor a pH of at least 6.4, whereby said liquor remains substantially stable in nitrite value for a period up to eighteen days under conditions of storage at about 40° F.

3. An aqueous pickle liquor for use in curing meats containing essentially (1) sodium chloride, (2) alkali metal nitrite, and (3) alkali metal ascorbate as the reaction product of an isomer of ascorbic acid and alkaline alkali metal phosphate in kind and quantity to impart to the liquor a pH of at least 6.4, whereby said liquor remains substantially stable in nitrite value for a period up to eighteen days under conditions of storage at about 40° F.

4. An aqueous pickle liquor for use in curing meats containing essentially (1) sodium chloride, (2) alkali metal nitrite, and (3) alkali metal ascorbate as the reaction product of an isomer of ascorbic acid and alkaline alkali metal polyphosphate in kind and quantity to impart to the liquor a pH of at least 6.4, whereby said liquor remains substantially stable in nitrite value for a period up to eighteen days under conditions of storage at about 40° F.

5. An aqueous pickle liquor for use in curing meats having a pH of at least 6.4 and comprising essentially alkali metal nitrite, and alkali metal ascorbate as the reaction product of an isomer of ascorbic acid and alkaline material in kind and quantity to impart said pH, whereby said liquor remains substantially stable in nitrite value for a period up to eighteen days under conditions of storage at about 40° F.

6. An aqueous pickle liquor for use in curing meats having a pH of at least 6.4 and comprising essentially alkali metal nitrite, and alkali metal ascorbate as the reaction product of an isomer of ascorbic acid and a carbonate of alkali metal in kind and quantity to impart said pH, whereby said liquor remains substantially stable in nitrite value for a period up to eighteen days under conditions of storage at about 40° F.

7. An aqueous pickle liquor for use in curing meats having a pH of at least 6.4 and comprising essentially alkali metal nitrite, and alkali metal ascorbate as the reaction product of an isomer of ascorbic acid and alkaline alkali metal phosphate in kind and quantity to impart said pH, whereby said liquor remains substantially stable in nitrite value for a period up to eighteen days under conditions of storage at about 40° F.

8. An aqueous pickle liquor for use in curing meats having a pH of at least 6.4 and comprising essentially alkali metal nitrite, and alkali metal ascorbate as the reaction product of an isomer of ascorbic acid and alkaline alkali metal polyphosphate in kind and quantity to impart said pH, whereby said liquor remains substantially stable in nitrite value for a period up to eighteen days under conditions of storage at about 40° F.

9. In an aqueous meat-curing pickle liquor containing in solution sodium chloride, alkali metal nitrite and alkali metal nitrate, the combination in solution of a compound providing an ascorbate radical and a pH regulating material providing alkali metal ions in part at least forming alkali-metal ascorbate and present in kind and quantity to impart to the liquor a pH of at least 6.4, whereby said liquor remains substantially stable in nitrite value for a period up to eighteen days under conditions of storage at about 40° F.

10. In an aqueous meat-curing pickle liquor containing in solution sodium chloride, alkali metal nitrite and alkali metal nitrate, the combination in solution of alkali metal ascorbate as the reaction product of an isomer of ascorbic acid and a carbonate of alkali metal in kind and quantity to impart to the liquor a pH of at least 6.4, whereby said liquor remains substantially stable in nitrite value for a period up to eighteen days under conditions of storage at about 40° F.

11. In an aqueous meat-curing pickle liquor containing in solution sodium chloride, alkali metal nitrite and alkali metal nitrate, the combination in solution of alkali metal ascorbate as the reaction product of an isomer of ascorbic acid and alkaline alkali metal phosphate in kind and quantity to impart to the liquor a pH of at least 6.4, whereby said liquor remains substantially stable in nitrite value for a period up to eighteen days under conditions of storage at about 40° F.

12. In an aqueous meat-curing pickle liquor containing in solution sodium chloride, alkali metal nitrite and alkali metal nitrate, the combination in solution of alkali metal ascorbate as the reaction product of an isomer of ascorbic acid and alkaline alkali metal polyphosphate in kind and quantity to impart to the liquor a pH of at least 6.4, whereby said liquor remains substantially stable in nitrite value for a period up to eighteen days under conditions of storage at about 40° F.

References Cited in the file of this patent

UNITED STATES PATENTS

| | | |
|---|---|---|
| 2,553,533 | Komarik et al. | May 15, 1951 |
| 2,707,154 | Lehmann et al. | Apr. 26, 1955 |
| 2,739,899 | Hollenbeck | Mar. 27, 1956 |

OTHER REFERENCES

"Food Technology," October 1949, pp. 332 to 336, inclusive, article entitled Antioxidants in the Hemoglobin Catalyst Oxidation of Unsaturated Fats.